United States Patent [19]

Kurz et al.

[11] 4,208,225

[45] Jun. 17, 1980

[54] DIRECTIONALLY SOLIDIFIED DUCTILE MAGNETIC ALLOYS MAGNETICALLY HARDENED BY PRECIPITATION HARDENING

[75] Inventors: Wilfried Kurz, Lausanne; Remi Glardon, Corseaux, both of Switzerland

[73] Assignee: Les Fabriques d'Assortiments Reunies, Le Locle, Switzerland

[21] Appl. No.: 849,956

[22] Filed: Nov. 9, 1977

Related U.S. Application Data

[63] Continuation-in-part of Ser. No. 683,617, May 5, 1976, abandoned.

[30] Foreign Application Priority Data

May 5, 1975 [CH] Switzerland ..................... 005725/75

[51] Int. Cl.[2] ......................... C04B 35/00; H01F 1/04

[52] U.S. Cl. ................................ 148/101; 148/31.57; 148/103

[58] Field of Search ...................... 148/31.57, 101–103; 75/170

[56] References Cited

U.S. PATENT DOCUMENTS

| | | | |
|---|---|---|---|
| 3,560,200 | 2/1971 | Nesbitt et al. | 75/122 |
| 3,682,715 | 8/1972 | Martin | 148/31.57 |
| 3,790,414 | 2/1974 | Tawara et al. | 148/31.57 |
| 3,998,669 | 12/1976 | Strnat | 148/31.57 |
| 4,047,982 | 9/1977 | Sagawa et al. | 148/101 |

FOREIGN PATENT DOCUMENTS

| | | | |
|---|---|---|---|
| 2017234 | 7/1971 | Fed. Rep. of Germany | 148/101 |
| 2143866 | 3/1972 | Fed. Rep. of Germany | 148/31.57 |
| 45-36658 | 11/1970 | Japan | 148/101 |
| 45-36661 | 11/1970 | Japan | 148/101 |
| 45-36662 | 11/1970 | Japan | 148/31.57 |
| 46-46098 | 2/1973 | Japan | 148/101 |

OTHER PUBLICATIONS

Chin et al., ". . . Solidification of Co—Cu—R . . . Alloys", IEEE, Trans. *Mag.* 8, 1972, p. 29.

Nagel et al., ". . . Microstructure of Sm(Co,Cu)$_2$. . . ", J. Appl. Phys., 47 (1976) 2662.

Nagel et al., "Hard Magnetic Properties . . . ", IEEE, Trans. *Mag.* 12 (1976) 959.

Colin et al., "Directional Freezing . . . Co—Cu—R. . .," Cobalt, 1975, p. A-27.

Menth et al., "Bulk-Hardened . . . 2:17 Magnets", Appl. Phys. Letts. 29 (1976), 270.

Glardon et al., ". . . Directionally Solidified . . . $Co_{17}Sm_2$. . .", J. Mat. Sc. 12 (1977), 658.

Nesbitt et al., "Cast . . . Magnets of the $Co_5RE$ Type . . . ", J. Appl. Phys. 42 (1971), 1530.

Takata, ". . . Microstructures . . . MM—Cu—Co . . . Alloys", Cobalt Abs. 1973, p. 65.

*Primary Examiner*—L. Dewayne Rutledge
*Assistant Examiner*—Upendra Roy
*Attorney, Agent, or Firm*—Karl F. Ross

[57] ABSTRACT

Magnetic alloys of a ternary composition as defined within the region A, B, C, D of the ternary diagram of FIG. 5, wherein X is one or more metals selected from the group which consists of iron, nickel, aluminum, copper, molybdenum and manganese, are cast and rendered ductile by the formation within the material during solidification of at least two phases. One of the phases is preferably ductile and formed essentially of fibers or dendrites of Co and the other phase or phases are from those normally found in rare-earth/cobalt magnets. The alloy is magnetically hardened by precipitation hardening.

5 Claims, 10 Drawing Figures

Three point banding test diagram on an alloy without ductile dendrites.

fracture energy $\gamma_F = 5\ J/m^2$

DIRECTIONALLY SOLIDIFIED DUCTILE MAGNETIC ALLOYS MAGNETICALLY HARDENED BY PRECIPITATION HARDENING

CROSS REFERENCE TO RELATED APPLICATION

This application is a continuation-in-part of Ser. No. 683,617 filed 5 May 1976, now abandoned.

FIELD OF THE INVENTION

The present invention relates to a process for the fabrication of magnetic alloys for permanent magnets and to the magnetic bodies obtained by this process.

More particularly the invention relates to ternary magnetic alloys consisting of rare-earth or rare earth-like elements, cobalt and at least one metal selected from the group which consists of iron, nickel, aluminum, copper, molybdenum or manganese.

BACKGROUND OF THE INVENTION

Ferromagnetic alloys of the cobalt/rare-earth type have a high energy product and for this reason have been widely used. At present they are generally fabricated by powder metallurgy, i.e. by sintering, high-pressure pressing or the like techniques. For example, powders of rare-earth/cobalt can be sheathed (enrobed) in a tin alloy and compacted or shaped therein. The alloys generally have the formula $TRCo_y$, where TR is a rare-earth element such as samarium (Sm), gadolinium (Gd), praseodymium (Pr), cerium (Ce), neodymium (Nd), holmium (Ho) or an element similar to a rare earth such as lanthanum (La) or yttrium (Y) or a mixture of such elements. y varies between 5 and 8.5.

Although these materials are remarkable for their magnetic properties, having a high intrinsic coercive force of, say, 25 kiloOersted (kOe) and a high saturation magnetization of, say, 10 kiloGauss (kG), resulting in a high energy product, they are fragile, difficult to work and sensitive to environmental conditions. Because of these shortcomings, the fabrication of small magnets by machining is difficult. When attempts are made to fabricate large magnets, it is found that the bodies tend to break during fabrication because of internal stresses.

Alloys containing copper as well as $TRCo_y$ which are prepared by casting have also been proposed heretofore. These alloys are subjected to a magnetic hardening treatment but are also found to be very brittle and difficult to work, particularly by turning and similar machining operations.

OBJECTS OF THE INVENTION

It is the principal object of the present invention to provide a process for fabricating high-performance magnets, especially of small dimensions and high precision, and also large magnets, which enables casting to be used and provides a product which can be subsequently machined without the difficulties encountered heretofore.

Another object of the invention is to provide a magnetic alloy which is free from the aforementioned disadvantages.

Still another object of the invention is to provide magnets which are readily machined and yet retain the high magnetic-energy product B x H characteristic of rare-earth/cobalt magnets.

Yet another object is to extend the principles of the above-mentioned copending application.

SUMMARY OF THE INVENTION

According to the present invention a ternary composition, preferably a compound of the formula TR(Co,X)y, is cast and rendered ductile by the formation of two different phases during solidification. The compound is thus a TR/cobalt compound supplemented with at least one additional metal X; X is selected from the group which consists of iron, nickel, aluminum, copper, molybdenum and manganese. One of the phases which are formed during solidification should be ductile and the compound or body is magnetically hardened by precipitation-hardening techniques.

Advantageously the ternary compound has a composition represented by the shaded region A, B, C, D of FIG. 5 and consists of 5 to 16.7 at.% (atomic percent) of the rare-earth-type element TR, 5 to 50 at.% of at least one supplemental metal X selected from the group consisting of iron, nickel, aluminum, copper, molybdenum or manganese. X can also represent a combination of one or more of these metals. The balance is cobalt.

For the purposes of this application TR represents elements selected from the group which consists of Sm, Gd, Pr, Ce, Nd, Ho, La and Y.

Unless otherwise indicated all percent compositions given herein are in atomic percent (at.%).

BRIEF DESCRIPTION OF THE DRAWING

The above and other objects, features and advantages of the present invention will become more readily apparent from the following description, reference being made to the accompanying drawing in which.

SPECIFIC DESCRIPTION AND EXAMPLES

Figure 1:
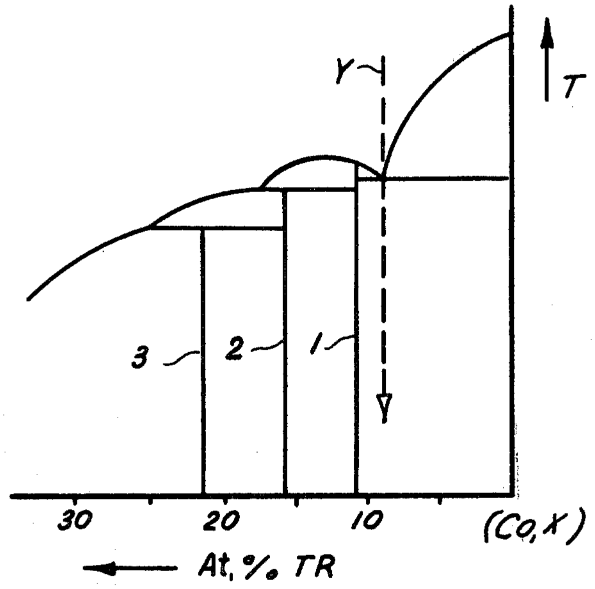
FIG. 1 is a schematic phase diagram illustrating an eutectic composition and serving for the purposes of explanation of a process according to the present invention.

The ordinate in FIG. 1 represents the temperature T while the abscissa shows the content in atomic percent of TR, the vertical lines 1, 2 and 3 indicating respectively the compositions $TR_2(Co,X)_{17}$, $TR(Co,X)_5$ and $TR_2(Co,X)_7$, compositions within the ambit of the present invention. X may be one or more metals selected from the group which consists of iron, nickel, aluminum, copper, molybdenum and manganese.

A molten alloy of the composition y (FIG. 1) will cool along the arrow to give a eutectic mixture of the matrix of $TR_2(Co,X)_{17}$ and fibers or lamellae of another phase such as (Co,X). X, as noted, represents an element which can be substituted for cobalt such as iron, nickel, aluminum, copper, molybdenum and manganese or a mixture thereof such as copper plus nickel, for example.

During the solidification, ductile fibers 11 (FIG. 3) in a magnetic matrix 12 are obtained. The solidification front 13 separates the liquid phase 14 from the solidifying phase 15. At 16 are shown the various interfaces between the two phases. 17 represents the distance between the ductile fibers which can vary between 1 and 10 microns according to the speed of solidification. The fiber length is a multiple of the distance between the fibers and the fibers may extend continuously throughout the body or in lengths upward of 100 microns.

Figure 2:
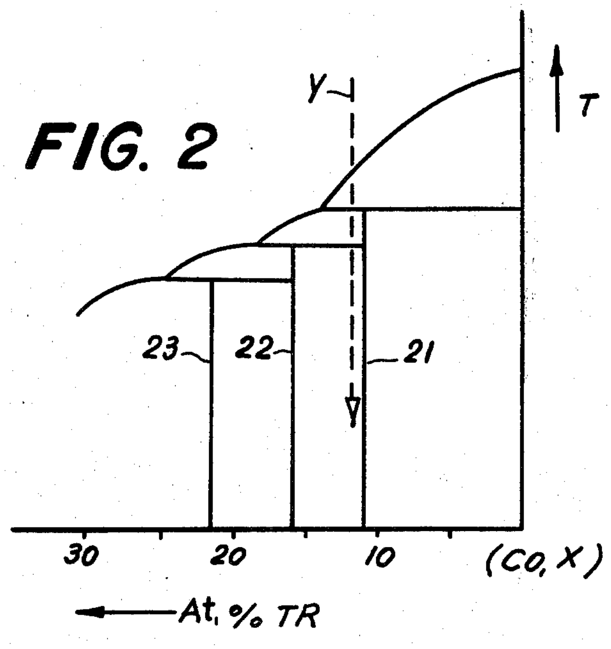
FIG. 2 is a schematic phase diagram illustrating a peritectic composition enabling another form of the process to be explained.

It is also possible to obtain a composite formed of a magnetic matrix $TR(Co,X)_5$ to 8.5 (y=5 to 8.5) together with a ductile phase (Co,X) in cellular or dendritic form. An alloy is solidified along the line y (FIG. 2). In this Figure, as in FIG. 1, T represents the temperature and is plotted along the ordinate while the TR content, in atomic percent is plotted along the abscissa. The lines 21, 22 and 23 represent the compounds $TR_2(Co,x)_{17}$, $TR(Co,X)_5$ and $TR_2(Co,X)_7$.

Figure 4:
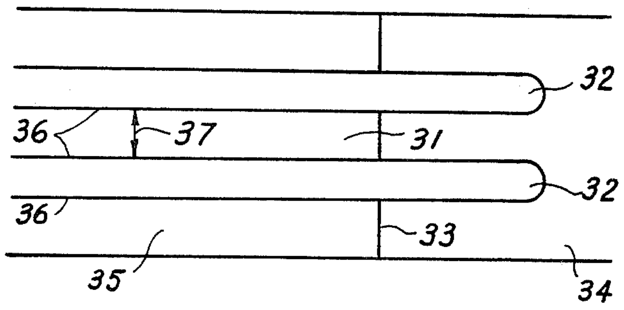
FIG. 4 is a diagram illustrating the cellular or dendritic growth which results when the process illustrated by FIG. 2 is carried out.

Ductile dendrites 32 (FIG. 4) are obtained in the magnetic matrix 31 from the system of FIG. 2. The solidification front 33 separates the liquid phase 34 from the solid phase 35. The interfaces are shown at 36 and the distance between the dendritic fibers 37 is larger than in previous case, e.g. about 50 microns. The fiber length may exceed 100 microns and the diameter of the fibers may be 25 to 30 microns on the average.

A brittle body can be made tougher according to the invention, by the introduction of a second ductile phase, with its associated interphase boundaries in the material. A composite body formed of two brittle phases is tougher than either of the phases taken alone and the mechanical properties of the composite body containing the two phases are improved. Even better properties can be obtained when one of the phases is a ductile phase which is associated with the brittle phase. The workability of the body is improved by the double effect of the presence of a ductile phase and the existence of phase interfaces.

The mechanical and particularly the magnetic properties of the alloys according to the invention can be improved by controlling the solidification to give an oriented structure as described. A directional-solidification furnace as described in U.S. Pat. No. 3,871,835 issued 18 Mar. 1975 can be used to achieve this process. Such a directional-solidification furnace may include a crucible which is moved at a predetermined speed relative to the heating elements just allowing the solidification conditions, the liquidus/solidus interface temperature gradient, solidification speed and the like to be established as is necessary to ensure the growth of the fiber phase.

The orientation is primarily important for obtaining the optimum magnetic properties. Magnetic hardening in all cases is obtained by provoking precipitation as is conventional in the art.

Figure 3:
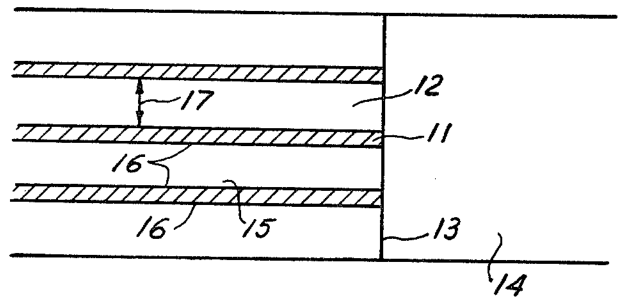
FIG. 3 illustrates forms of the growth of the ductile and magnetic phases according to the phase diagram of FIG. 1.

A similar improvement in the mechanical properties and magnetic properties of a body can be obtained by casting the alloy in a mold which is cooled at the base, thereby carrying out directed solidification. Using an alloy of the composition y of FIG. 1, a structure similar to that in FIG. 3 is obtained although the fibers may be partly or completely in cellular or dendritic form. Similarly with the alloys shown in FIG. 2, e.g. of composition y, a structure similar to that shown in FIG. 4, although the dendrites may have secondary branches, is formed.

Figure 5:
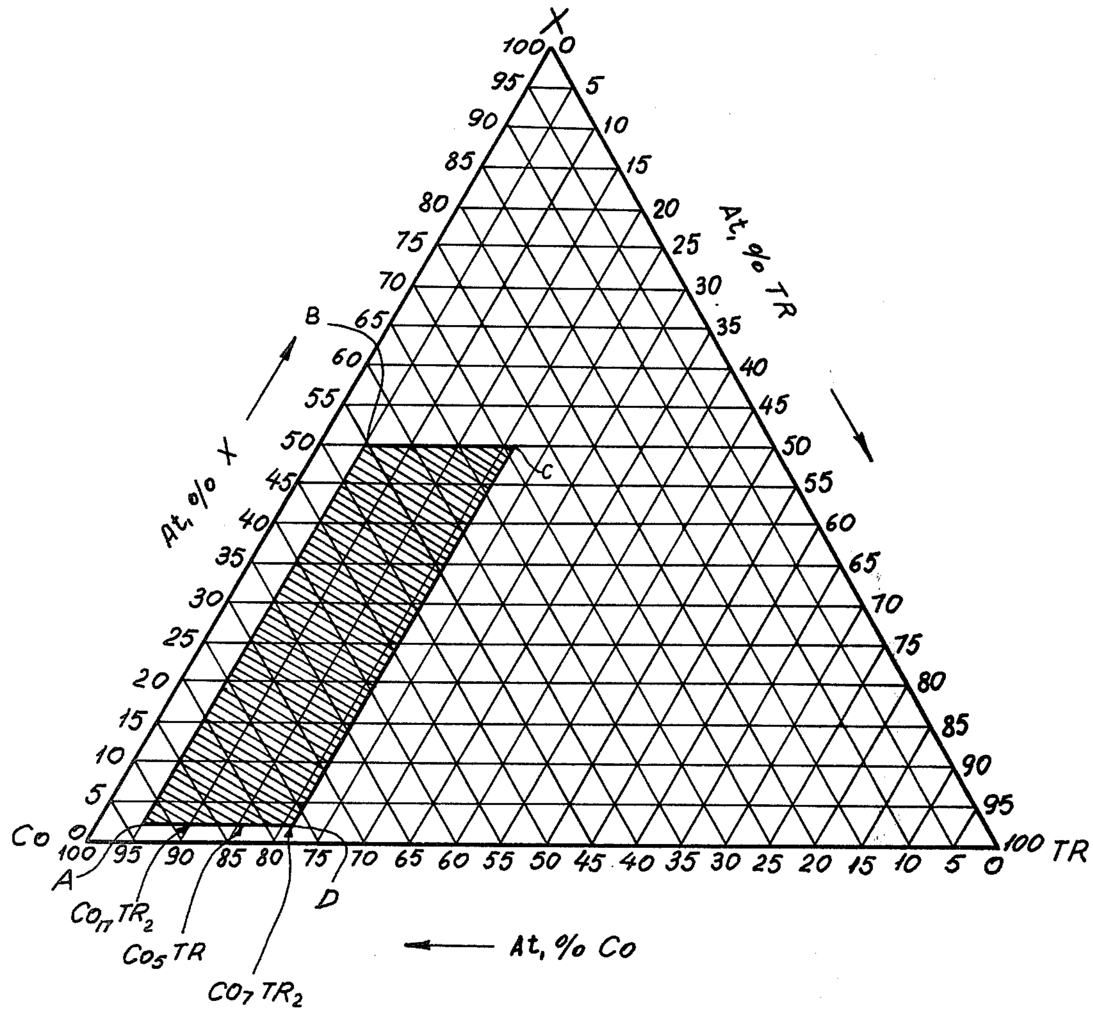
FIG. 5 is a ternary diagram illustrating compositions which are examples of the alloys of the present invention.

The compositions from which magnetic alloys can be prepared according to the invention are represented by the shaded region A, B, C, D of FIG. 5 in which the cobalt content is plotted along the lower axis in atomic percent the TR content is plotted along the right hand axis in atomic percent and the replacement metal X is plotted along the left hand axis in atomic percent. The shaded diagram represents compositions between (Co+5 at. % TR) and $Co_5$ TR with between 5 and 50 at. % of the element X, where X is one or more of the elements iron, nickel, aluminum, copper, molybdenun and manganese.

The advantages of the magnets according to the present invention are numerous. They have high magnetic properties which are stable over long periods and under various environmental conditions. Their mechanical properties are superior to those of TR-cobalt magnets as are presently available, particularly with respect to their ability to be machined as proven by comparative tests. They can be machined by chip-removal methods, thereby allowing magnets of all shapes and sizes to be fabricated. They can be readily ground and hence given precision dimensions. Their toughness is superior to commercial TR-cobalt magnets. Finally, it is possible to cast large pieces by the methods described above, since the improvement of the mechanical properties of the pieces allows them to be better able to resist the thermal stresses occurring on cooling.

The precipitation hardening can be carried out by subjecting the cast body to a solution treatment at a temperature above 900° C. followed by precipitation by example at 400° to 700° C. for one to two hours.

The following alloy compositions are subjected to directional solidification and precipitation hardening with the effects described:

| Composition | Constituents | Atomic Percent | Br KGs | Hc KOe |
|---|---|---|---|---|
| I | cobalt | 55 | | |
| | samarium | 12 | 5 | 5 |
| | copper | 25 | | |
| | iron | 5 | | |
| | lanthanum | 3 | | |
| II | cobalt | 55 | | |
| | copper | 12 | 6 | 5 |
| | nickel | 10 | | |
| | copper | 15 | | |
| | iron | 5 | | |
| | lanthanum | 3 | | |
| III | cobalt | 67 | | |
| | samarium | 9 | | |

-continued

| Composition | Constituents | Atomic Percent | Br KGs | Hc KOe |
|---|---|---|---|---|
| | copper | 15 | 8 | 1 |
| | iron | 5 | | |
| | lanthanum | 4 | | |
| IV | samarium | 8 | | |
| | praseodymium | 6 | | |
| | cobalt | 61 | 7 | 4 |
| | copper | 20 | | |
| | iron | 5 | | |
| V | samarium | 10 | | |
| | cerium | 4 | | |
| | iron | 5 | 8 | 3 |
| | copper | 15 | | |
| | cobalt | 66 | | |
| VI | cobalt | 63 | | |
| | lanthanum | 6 | similar to composition III | |
| | copper | 25 | | |
| | samarium | 6 | | |
| VII | samarium | 12 | | |
| | lanthanum | 2 | 7.5 | 2 |
| | cobalt | 56 | | |
| | copper | 20 | | |
| | iron | 10 | | |
| VIII | samarium | 10 | | |
| | cerium | 4 | | |
| | copper | 15 | 7.5 | 3 |
| | cobalt | 71 | | |
| IX | copper | 15 | | |
| | aluminum | 15 | | |
| | molybdenum | 5 | | |
| | cerium | 10 | | |
| | cobalt | 55 | | |
| X | samarium | 10 | | |
| | lanthanum | 4 | | |
| | copper | 15 | | |
| | nickel | 5 | | |
| | cobalt | 56 | | |
| | iron | 5 | | |
| | aluminum | 5 | | |
| XI | samarium | 6 | | |
| | lanthanum | 3 | | |
| | cerium | 1 | | |
| | copper | 6 | | |
| | nickel | 5 | | |
| | cobalt | 61 | | |
| | iron | 5 | | |
| XII | samarium | 10 | | |
| | lanthanum | 3 | | |
| | praseodymium | 5 | | |
| | copper | 15 | | |
| | nickel | 10 | | |
| | cobalt | 52 | | |
| | iron | 5 | | |

The magnetic properties cited are the saturation magnetization (Br) and the coercive force (Hc).

A preferred composition has TR constituted by a mixture of Sm with La, Pr and/or Ce and can contain up to 40 at.% La, Pr, Ce. The X is preferably copper or copper mixed with up to 50 at.% of the X component of Fe, Ni, Al. A most suitable composition comprises TR=5 to 15 at.% of which the major constituent is Sm, 5 at.% Fe, copper or Cu+Ni from 5 to 20 at.%, balance cobalt.

From the foregoing it will be apparent that, while the alloy contains 5 to 16.7 at.% Tr, the ductile phase is composed essentially of cobalt and the composition of the magnetic matrix is represented between $TR(Co,X)_5$ to $TR_2(Co,X)_{17}$, this contains TR in an amount of 10.5 to 16.7 at.%, and cobalt constitutes the balance.

Figure 6:
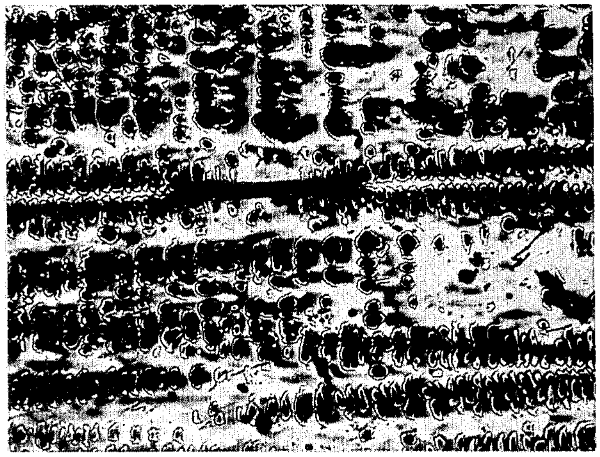
FIG. 6 is a photomicrograph (50× enlargement) illustrating the composite structure of the material of the present invention.

FIG. 6 shows, in photomicrograph form, the composite of the present invention in which the ductile cobalt dendrites can readily be distinguished from the brittle magnetic matrix.

Figure 7:
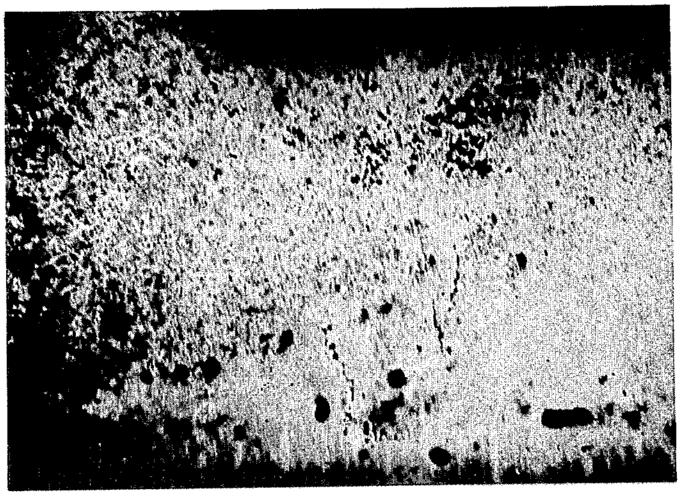
FIG. 7 is a photomicrograph (6×) of a microstructure of an alloy according to the invention with ductile cobalt dendrites evidencing no cracking although it was subjected to solidification at a high cooling rate.
Figure 8:
FIG. 8 is a photomicrograph of the alloy of FIG. 7 (6×) without ductile cobalt dendrites showing the cracking resulting from cooling with the same regimen.

After a regimen of rapid cooling the composite of the invention (FIG. 7) shows no evidence of cracking (composition corresponding to that of Example XIII) while a similar composition (modified to avoid dendrites but to reproduce the matrix composition) without the formation of the ductile dendrites (FIG. 8) shows heavy cracking.

Figure 9:
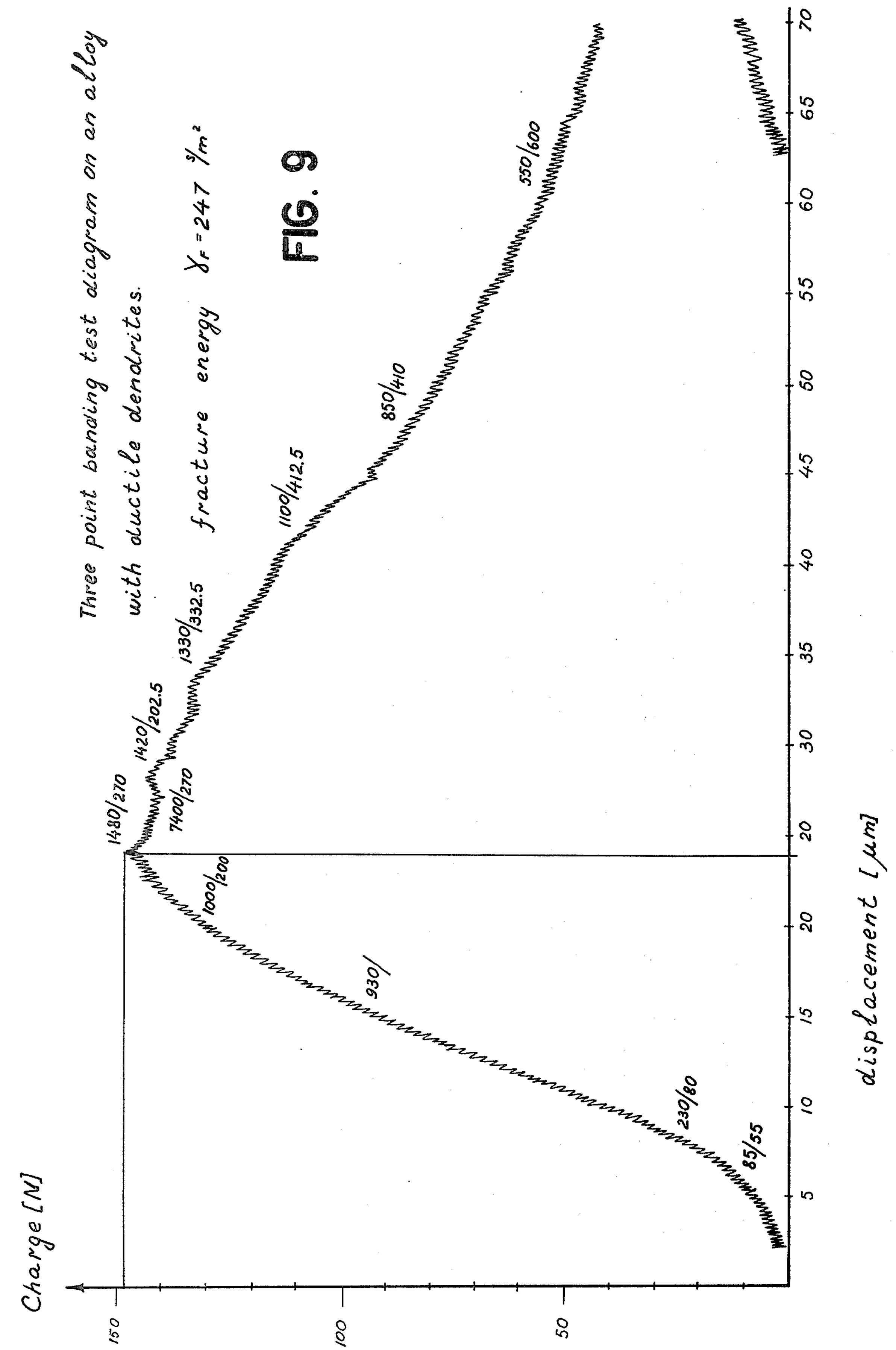
FIG. 9 is a graph showing the results of the three-point bending test of an alloy with ductile dendrites according to the invention.
Figure 10:
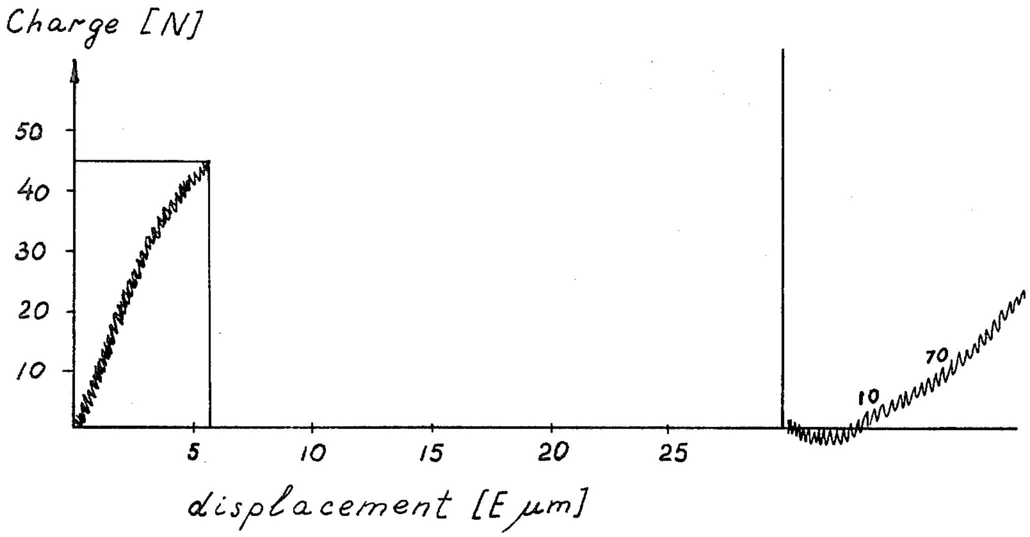
FIG. 10 is a graph showing the corresponding results for an alloy without ductile dendrites.

FIGS. 9 and 10 give the test results for these two alloys, showing the remarkable improvement resulting from the presence of the cobalt ductile dendrites. All of the compositions given have good magnetic properties as well.

We claim:

1. A body of a magnetic alloy consisting essentially of a ductile phase in a magnetic matrix, the ductile phase consisting essentially of cobalt, and the magnetic phase consisting essentially of cobalt, TR and X wherein TR is at least one rare earth element or lanthanium or yttrium and X is at least one metal selected from the group consisting essentially of copper, iron, nickel, aluminum, molybdenum, and manganese wherein the limits of the cobalt, TR and X in the magnetic alloy are TR between 12 and 15 atomic percent, X between 20 and 30 atomic percent and Co between 55 and 67 atomic percent, said body exhibiting a magnetic energy product of at least 6 MGOe and a mechanical energy to rupture of at least 40 Joules/$m^2$.

2. The body of the magnetic alloy defined in claim 1 exhibiting an energy product of at least 10 MGOe.

3. In a process for making the body of a magnetic alloy comprising the steps of: melting a mixture of essentially the elements Co, X and TR wherein X is at least one metal selected from the group consisting of copper, iron, nickel, aluminum, molybdenum, and manganese to give a homogeneous melt and TR is at least one rare earth element or lanthanium or yttrium; cooling said melt by controlling the temperature gradient in the liquid, and the growth rate of the solid, such that after solidification the orientation of easy magnetization of most TR-Co grains are approximately parallel; and heating the solid alloy in order to magnetically harden the TR-Co grains;

the improvement which comprises:

forming said mixture in such a proportion, within the limits of TR between 12 and 15 atomic percent, X between 20 and 30 atomic percent and Co between 55 and 67 atomic percent of the mixture so that an alloy is obtained, consisting of a ductile phase of dendrites consisting essentially of cobalt, dispersed in a magnetic matrix consisting essentially of cobalt, TR and X, which has magnetic energy product of 6 MGOe and a mechanical energy rupture of at least 40 Joules/$m^2$.

4. The improvement defined in claim 3 wherein TR is essentially samarium mixed with up to 50 atomic percent of the total TR with other elements selected from the group consisting of La, Pr and Ce.

5. The improvement defined in claim 3 wherein X is essentially Cu with up to 50 atomic percent of the total X being constituted by at least one other metal selected from the group which consists of Fe, Ni, Al, Mb and Mn.

* * * * *